March 10, 1925. 1,529,589
H. HÉBRARD
PISTON
Filed March 25, 1919
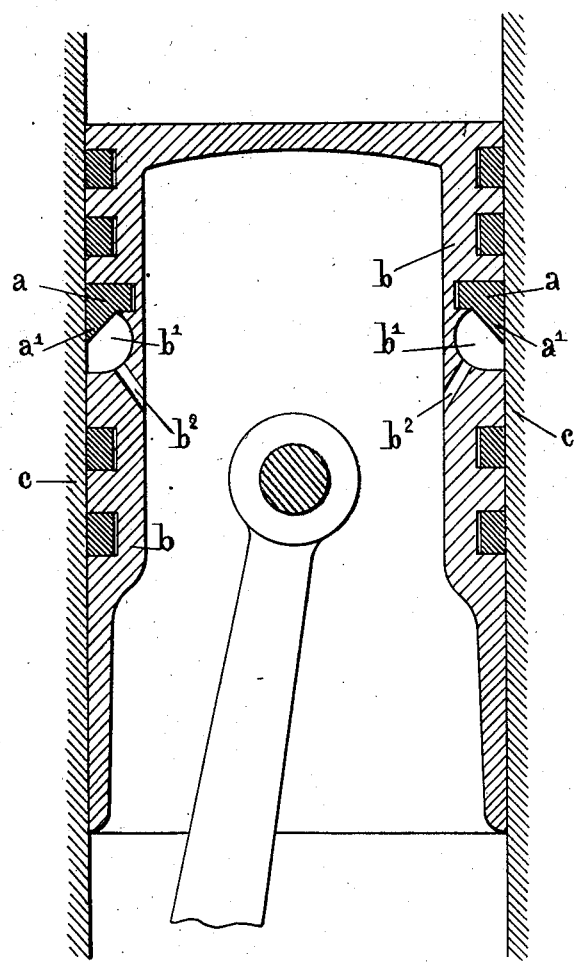
INVENTOR
HENRI HÉBRARD
BY *Howson and Howson*
ATTORNEYS Patented Mar. 10, 1925.

1,529,589

UNITED STATES PATENT OFFICE.

HENRI HÉBRARD, OF NEUILLY-SUR-SEINE, FRANCE.

PISTON.

Application filed March 25, 1919. Serial No. 285,086.

(GRANTED UNDER THE PROVISIONS OF THE ACT OF MARCH 3, 1921, 41 STAT. L., 1313.)

*To all whom it may concern:*

Be it known that I, HENRI HÉBRARD, a citizen of the Republic of France, and a resident of 6 Rue Devès, Neuilly-sur-Seine, France, have invented new and useful Improvements in Pistons (for which I have filed an application in France, October 18, 1916), of which the following is a specification.

This invention has for object to reduce as far as possible in motors and particularly in rotary engines, the projections of oil passing between the piston and the inner walls of the cylinder.

This result is obtained by adding to one of the piston packing rings a portion in the shape of an acute angled lip or salient, serving as a scraper which collects the oil upon the cylinder walls and forces it into an annular pocket formed in the exterior surface of the piston beneath this ring, so as to return it below the piston by one or more channels extending from this pocket and passing through the piston.

The annexed drawing represents by way of example and in axial vertical section, a piston constructed in accordance with the invention.

The packing ring $a$ of the piston $b$ comprises upon its outer face an acute-angled lip or salient $a^1$ pointing inwardly, that is to say, towards the crank shaft; this lip $a^1$ serves as a scraper collecting the oil upon the walls of the cylinder $c$ and returning it into an annular pocket $b^1$ formed in the outer surface of the piston below the ring $a$; the oil is driven into this pocket and is delivered beneath the piston by one or more channels $b^2$ extending from this pocket $b^1$ and passing through the piston wall. The oil can thus be utilized again for lubricating the piston.

This arrangement is especially advantageous for highspeed rotary engines in which it allows of reducing to a considerable extent the projections of oil passing between the piston and the cylinder.

What I claim is:

A piston having a series of longitudinally spaced packing rings located in its outer face, one of the intermediate rings of the series having a continuous circular scraper lip formed in extension of the bearing face of said packing ring, the outer wall of the piston having a circumferential groove communicating with the interior of the piston, and within which groove said scraper lip is wholly located, the faces of the scraper lip being straight and sub-tending an acute angle between them.

In testimony whereof I have signed my name to this specification.

HENRI HÉBRARD.

Witnesses:
 CHARLES DRUE,
 M. DEFÉVRIMONT.